United States Patent
Asano

(10) Patent No.: US 8,065,507 B2
(45) Date of Patent: Nov. 22, 2011

(54) DATA PROCESSING DEVICE THAT DISPLAYS A SETTING SCREEN FOR SETTING OPERATIONS OF A CONNECTED APPARATUS

(75) Inventor: Kazuko Asano, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 828 days.

(21) Appl. No.: 12/113,466

(22) Filed: May 1, 2008

(65) Prior Publication Data

US 2008/0307212 A1  Dec. 11, 2008

(30) Foreign Application Priority Data

Jun. 8, 2007  (JP) ................................. 2007-153319
Jul. 17, 2007  (JP) ................................. 2007-186108

(51) Int. Cl.
  *G06F 9/00* (2006.01)
  *G06F 15/177* (2006.01)
  *G06F 1/24* (2006.01)
(52) U.S. Cl. ................................. 713/1; 713/2; 713/100
(58) Field of Classification Search .................. 713/1, 2, 713/100
See application file for complete search history.

(56) References Cited

U.S. PATENT DOCUMENTS

| | | | |
|---|---|---|---|
| 5,692,111 A | 11/1997 | Marbry et al. | |
| 5,907,669 A * | 5/1999 | Yoshiura et al. | 358/1.16 |
| 7,400,427 B2 * | 7/2008 | Honma | 358/1.15 |
| 7,649,639 B2 * | 1/2010 | Oshiumi et al. | 358/1.13 |
| 2002/0083131 A1 | 6/2002 | Machida | |
| 2004/0109017 A1 | 6/2004 | Rothman et al. | |
| 2004/0139200 A1 | 7/2004 | Rossi et al. | |
| 2005/0073715 A1 * | 4/2005 | Sakai et al. | 358/1.15 |
| 2005/0114315 A1 | 5/2005 | Tanner et al. | |
| 2005/0200880 A1 * | 9/2005 | Oshiumi et al. | 358/1.14 |
| 2010/0157343 A1 * | 6/2010 | Uchida | 358/1.13 |

FOREIGN PATENT DOCUMENTS

| | | |
|---|---|---|
| EP | 1 271 302 A2 | 1/2003 |
| JP | 2003-323268 | 11/2003 |
| JP | 2004-234169 | 8/2004 |
| WO | WO 2006/106792 A1 | 10/2006 |

* cited by examiner

*Primary Examiner* — Suresh Suryawanshi
(74) *Attorney, Agent, or Firm* — Oblon, Spivak, McClelland, Maier & Neustadt, L.L.P.

(57) ABSTRACT

A data processing device is disclosed that is able to limit functions of a connected apparatus without providing additional components in the apparatus and without dependence on types of the apparatus. The data processing device includes a function limiting file storage unit to store a function limiting file; a function list file storage unit to store function list files dependent upon the apparatus type and function list files independent of the apparatus type, the function list files including descriptions of functions available in the apparatus; a function list file selection unit to select one of the function list files corresponding to the apparatus type; and a display item generation unit to generate a setting screen image for setting operations of the apparatus based on the selected function list file and the function limiting file stored in the function limiting file storage unit.

13 Claims, 14 Drawing Sheets

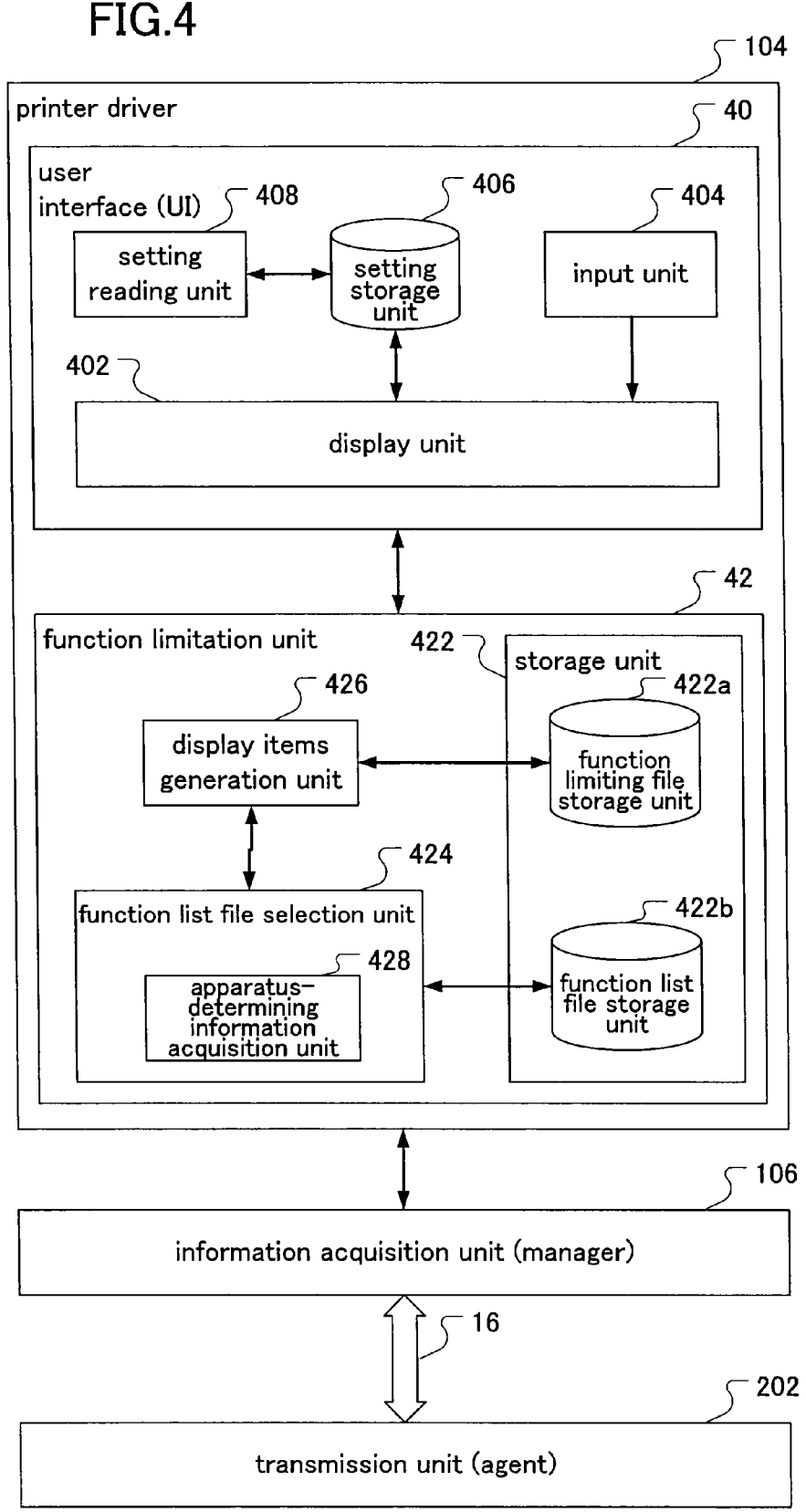

FIG.5

```
//A function list file of a printer modelA
@printer="modelA"  ～ 510

//Descriptions of functionA
  @function="functionA"  ～ 520a
  //Default values of functionA
    @default="valueA1"  ～ 520b //Prohibition descriptions of functionA
    @invalid="functionC isn't valueC1."
    @invalid="functionD is valueD2."        } 520c //Options of functionA
    @value="valueA1"  ～ 521a //Prohibition descriptions of valueA1
      @invalid="functionB is valueB2.
               functionC is valueC3."       } 521b @value="valueA2"  ～ 522a @value="valueA3"  ～ 523a
    //Prohibition descriptions of valueA3
      @invalid="functionE is valueE1."  ～ 523b @value="valueA4"  ～ 524a //Descriptions of functionB
  @function="functionB"
    @default="valueB1"

@invalid="functionD is valueD2."

@value="valueB1"

@value="valueB2"

@invalid="functionE is valueE1."

//Descriptions of functionC
  @function="functionC"
    @default="valueC1"

@value="valueC1"

@value="valueC2"

@end
```

520 encompasses the functionA block; 530 encompasses the functionB block; 540 encompasses the functionC block. Overall figure labeled 50.

FIG.6

```
//A general-purpose function list file
@printer="general"           ⌐ 610

//Descriptions of functionA
  @function="functionA"       ⌐ 620a
  //Default values of functionA
    @default="valueA1"        ⌐ 620b //Prohibition descriptions of functionA
    @invalid="functionC isn't valueC1."
    @invalid="functionD is valueD2."        } 620c //Options of functionA
    @value="valueA1"          ⌐ 621a @value="valueA2"          ⌐ 622a @value="valueA3"          ⌐ 623a
    //Prohibition descriptions of valueA3
      @invalid="functionE is valueE1."      ⌐ 623b //Descriptions of functionC
  @function="functionC"
    @default="valueC1"

@value="valueC1"

@value="valueC2"

@end
```

```
//A function limiting file of user: xxx
@lockuser="xxx"    — 710
  //A list of options available to functionA
  @function="functionA" — 721
    @value="valueA2"
    @value="valueA3"    } 722        } 720
    @value="valueA4"

//Value of function B is fixed to be valueB1
  @function="functionB" — 731
    @lock="valueB1"   — 732          } 730
@end
```

FIG.9
(a)
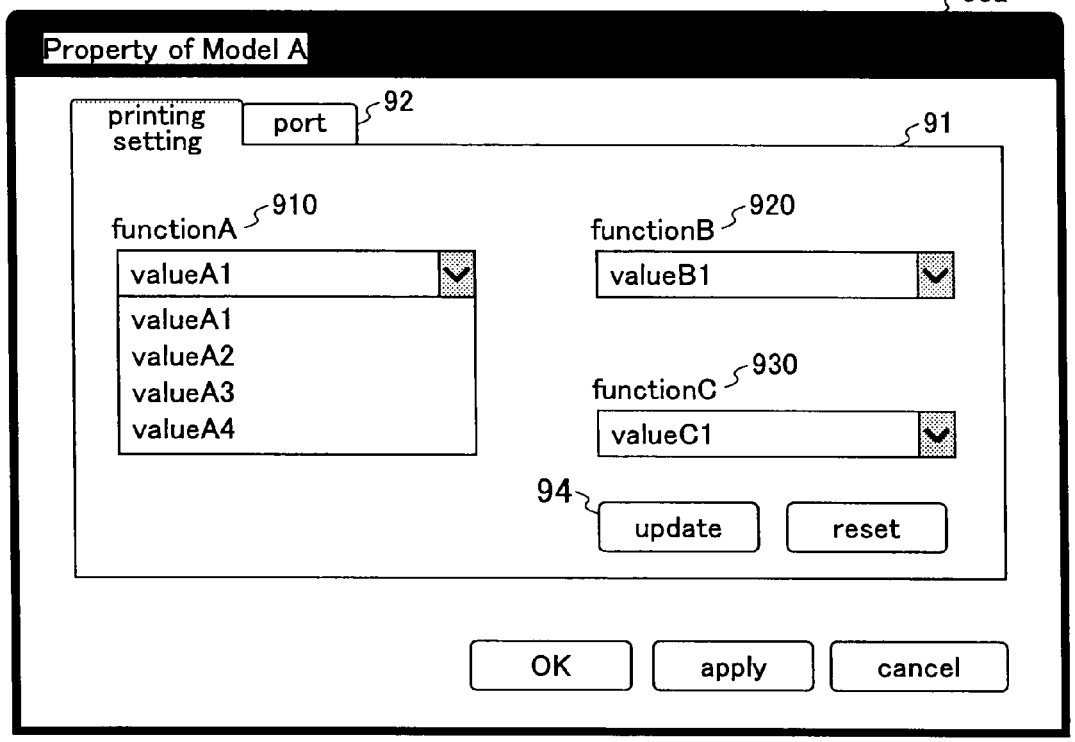
(b)
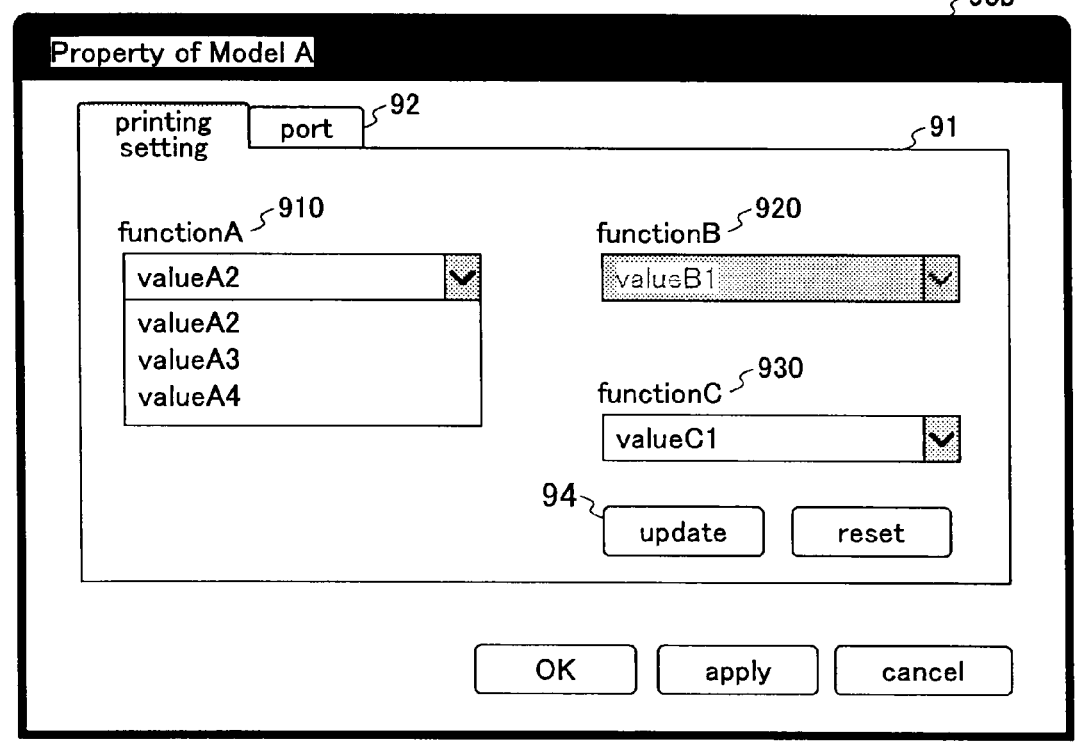

FIG.12
(a)
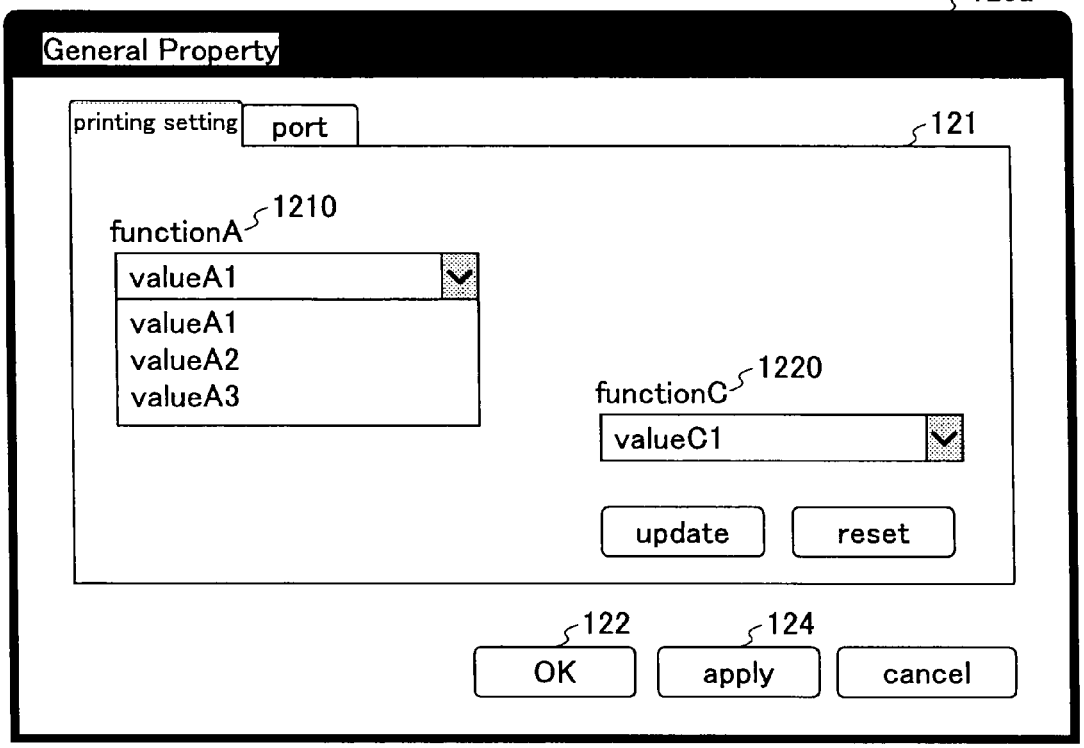
(b)
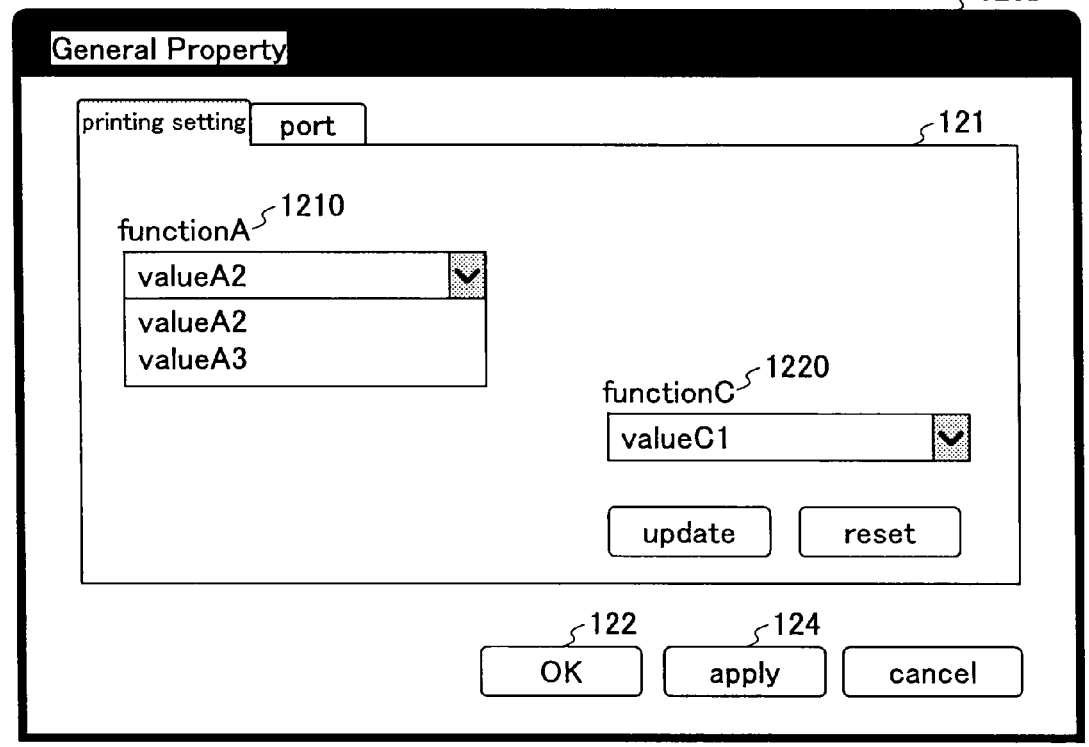

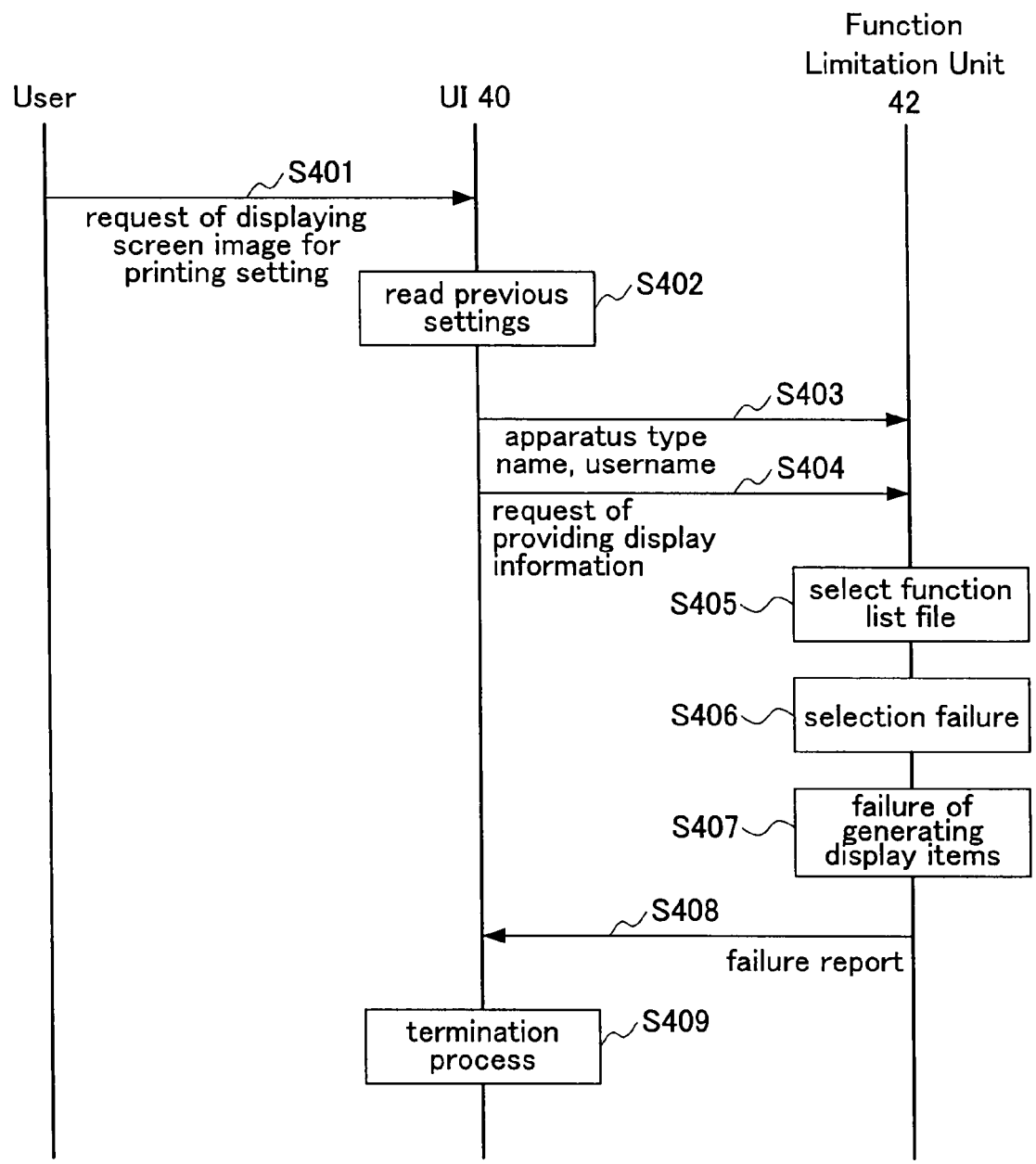

DATA PROCESSING DEVICE THAT DISPLAYS A SETTING SCREEN FOR SETTING OPERATIONS OF A CONNECTED APPARATUS

BACKGROUND OF THE INVENTION

1. Field of the Invention

The present invention relates to a data processing device able to limit functions of an apparatus connected to the data processing device.

2. Description of the Related Art

When a printer, a scanner, a facsimile machine, or another peripheral device is connected to a personal computer or other data processing device through a network or in series, the personal computer includes device drivers for converting data created or viewed by applications installed in the personal computer to data able to be processed by the peripheral devices.

For example, when a laser printer is connected to a personal computer, generally, a printer driver for the laser printer is installed in the personal computer, and thereby, the data created or viewed by applications are converted into page-description language (PDL) data which are able to be processed by the laser printer. In order for one personal computer to utilize multiple laser printers connected through a network, it is necessary to install the printer drivers for the multiple laser printers in the personal computer.

For example, when using printers in an office network system, sometimes it is recommended to use "double face printing", "collective printing", or other special printing settings. In this case, in a system in which each of the personal computers on the network has one printer driver (in other words, the personal computers on the network correspond to the printer drivers installed in the personal computers one by one), in order to apply the same specific printing settings to all printers, it is necessary to limit the printing setting items in each printer driver.

For example, Japanese Laid Open Patent Application No. 2004-2341693 (hereinafter, referred to as "reference 1") discloses a printing device able to specify items usable or unusable for each user by using setting information stored in the printing device. The printing device receives information indicating whether a printing setting item specified by a printer driver (in the personal computer) is usable or not usable, and stores the information in a memory of the printing device. When the printing device is used once again, the printing device transmits the stored information indicating whether a printing setting item is usable to the personal computer, and the printer driver in the personal computer displays the obtained information on a user interface (UI).

In addition, Japanese Laid Open Patent Application No. 2003-323268 (hereinafter, referred to as "reference 2") discloses a printing system able to limit functions of a printer to be used, in which a host computer having a printer driver able to set printing conditions into printing data is connected to a printing device able to generate image data from the printing data transmitted from the host computer and to print the generated image data. Limitation of functions of the printer device is performed on an operational panel on the printer device, and information concerning printer device function limitation is stored in the printer device. When displaying a user interface (UI), the printing driver acquires the function limitation information from the printer device, and displays the function limitation information on the user interface.

However, in order to realize the printing device and the printing system disclosed in reference 1 and reference 2, it is necessary to provide a unit for limiting the printing setting items on both the printer driver and the printer. In addition, in the techniques disclosed reference 1 and reference 2, as described above, each of the personal computers on the network has one printer driver (namely, the personal computers on the network correspond to the printer drivers installed in the personal computers one by one); thus, each time a printer connected to a personal computer is changed, the printer driver has to be changed, and it is necessary to execute a series of operations for limiting the printing setting items, requiring interactive communications between the printer and the personal computer.

SUMMARY OF THE INVENTION

The present invention may solve one or more problems of the related art.

A preferred embodiment of the present invention may provide a data processing device able to limit functions of an apparatus connected to the data processing device without providing additional components in the apparatus and without dependence on types of the apparatus.

According to a first aspect of the present invention, there is provided a data processing device, comprising:

a function limiting file storage unit configured to store a function limiting file for limiting a function of an apparatus connected to the data processing device;

a function list file storage unit configured to store a plurality of function list files dependent upon a type of the apparatus and a plurality of function list files independent of the type of the apparatus, the function list files including descriptions of functions available in the apparatus;

a function list file selection unit configured to select one of the function list files corresponding to the type of the apparatus; and a display item generation unit configured to generate a setting screen image for setting operations of the apparatus based on the selected one of the function list files and the function limiting file stored in the function limiting file storage unit.

According to the above embodiment, it is possible to provide a data processing device able to limit functions of an apparatus connected to the data processing device without providing additional components in the apparatus and without dependence on types of the apparatus.

Preferably, the function list file selection unit includes an apparatus-determining information acquisition unit configured to acquire, from the apparatus, apparatus-determining information for determining the apparatus, and the function list file selection unit selects the one of the function list files corresponding to the type of the apparatus based on a device type name included in the apparatus-determining information.

According to the above embodiment, even when the apparatus in connection is changed, it is possible to limit the functions of the changed apparatus without dependence on the type of the changed apparatus.

Preferably, the function list files include descriptions of prohibition rules between the apparatus and other apparatuses.

Preferably, the function limiting file limits the function of the apparatus by designating the function of the apparatus and/or a setting value of the function to be usable or unusable.

According to the above embodiment, it is not necessary to perform function limitation processing each time the apparatus is used.

Preferably, different users have different function limiting files.

According to the above embodiment, it is possible to perform different function limitation processing for different users.

According to a second aspect of the present invention, there is provided a storage medium readable by a computer and storing a data processing program executable on the computer to drive the computer to execute a data processing method of a data processing device, the data processing method comprising:

a function limiting file storage step of storing a function limiting file for limiting a function of an apparatus connected to a data processing device;

a function list file storage step of storing a plurality of function list files dependent upon a type of the apparatus and a plurality of function list files independent of the type of the apparatus, the function list files including descriptions of functions available in the apparatus;

a function list file selection step of selecting one of the function list files corresponding to the type of the apparatus; and a display item generation step of generating a setting screen image for setting operations of the apparatus based on the selected one of the function list files, and the function limiting file stored in the function limiting file storage unit.

According to a third aspect of the present invention, there is provided a data processing method of a data processing device, comprising:

a function limiting file storage step of storing a function limiting file for limiting a function of an apparatus connected to a data processing device;

a function list file storage step of storing a plurality of function list files dependent upon a type of the apparatus and a plurality of function list files independent of the type of the apparatus, the function list files including descriptions of functions available in the apparatus;

a function list file selection step of selecting one of the function list files corresponding to the type of the apparatus; and a display item generation step of generating a setting screen image for setting operations of the apparatus based on the selected one of the function list files, and the function limiting file stored in the function limiting file storage unit.

According to the above embodiments of the present invention, since a function limiting file for limiting a function of an apparatus connected to the data processing device, and function list files including descriptions of functions available in the apparatus and dependent upon a type of the apparatus and independent of the type of the apparatus are stored in advance, it is possible to provide a data processing device, a data processing method, and a storage medium able to limit functions of an apparatus connected to the data processing device without providing additional components in the apparatus and without dependence on types of the apparatus.

These and other objects, features, and advantages of the present invention will become more apparent from the following detailed description of preferred embodiments given with reference to the accompanying drawings.

BRIEF DESCRIPTION OF THE DRAWINGS

FIG. 4 is a block diagram illustrating a configuration of the printer driver 104 installed in the computer 10 according to the present embodiment;

FIG. 5 is a diagram illustrating an example of the function list file;

FIG. 6 is a diagram illustrating another example of the function list file;

FIG. 7 is a diagram illustrating an example of the function limiting file;

FIG. 9A and FIG. 9B are schematic views illustrating examples of the printing setting screen images according to the present embodiment;

FIG. 12A and FIG. 12B are schematic views illustrating examples of the printing setting screen images according to the present embodiment;

FIG. 14 is a sequence diagram illustrating operations of the printer driver 104 according to the present embodiment for stopping processing when the printer driver 104 fails to select a function list file in the operations of displaying the setting screen image with reference to FIG. 10 in the first embodiment.

DESCRIPTION OF THE PREFERRED EMBODIMENTS

Below, preferred embodiments of the present invention are explained with reference to the accompanying drawings.

Figure 1:
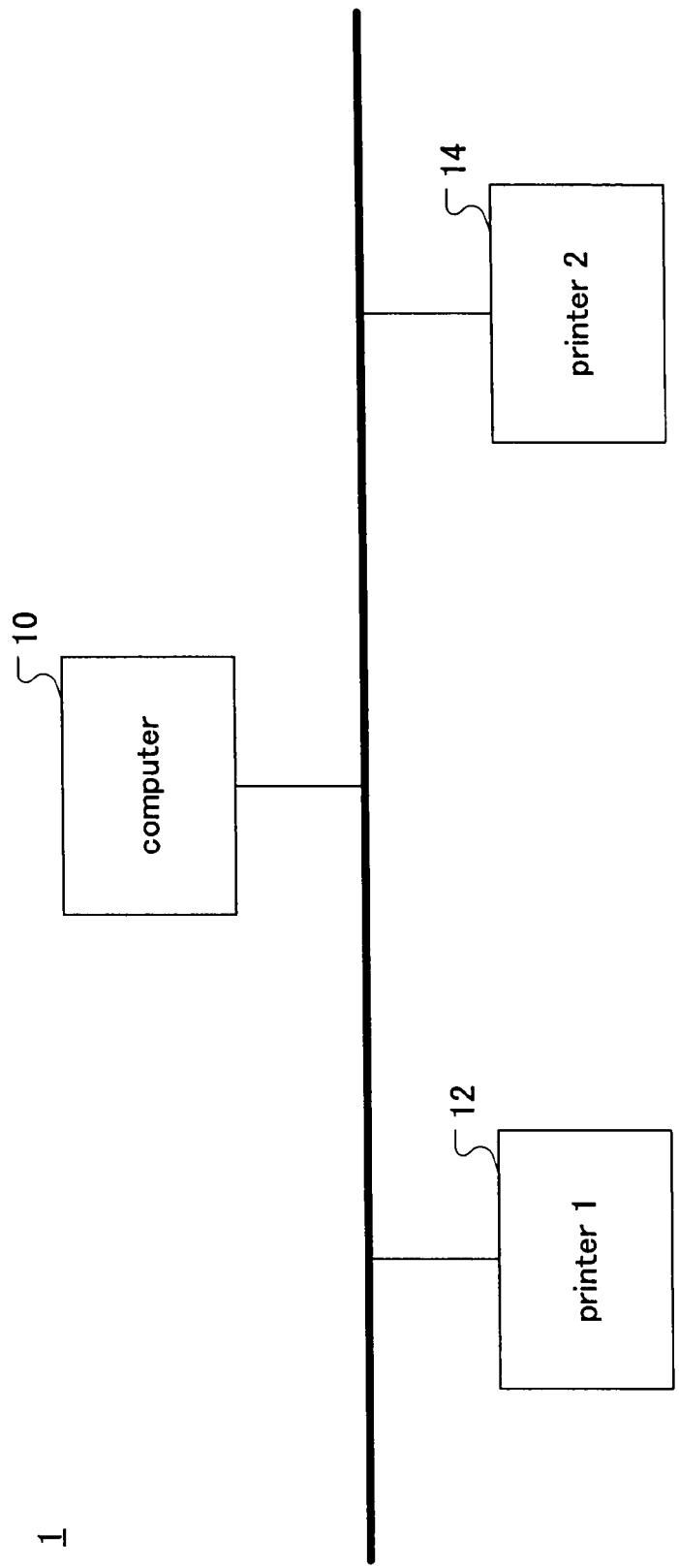
FIG. 1 is a block diagram illustrating a data processing system constructed through a network according to an embodiment of the present invention.

FIG. 1 is a block diagram illustrating a data processing system constructed through a network according to an embodiment of the present invention.

In FIG. 1, a data processing system 1 includes a computer 10 serving as a data processing device of the present invention, a first printer 12, a second printer 14, and a network 16 connecting the computer 10, the first printer 12 and the second printer 14 and enabling data communications between the first printer 12 and the second printer 14.

The computer 10 may be a personal computer (PC) able to display a user interface (UI) based on an Operating System (OS), a Personal Digital Assistant (PDA), a mobile phone, or others.

The first printer 12 and the second printer 14 are apparatuses operating in response to requests from the computer 10.

In the present embodiment, it is assumed that the first printer 12 and the second printer 14 are laser printers (LP) or multifunction peripherals (MFP).

In FIG. 1, although only one computer and two printers are illustrated, the data processing system 1 may include more computers and printers. In addition, the computer 10, the first printer 12 and the second printer 14 may be connected through a local area network (LAN), the Internet, or other networks, and may also be connected in series, by such as a USB (Universal Serial Bus).

Below, assume the data processing system of the present embodiment is a network system managed by SNMP (Simple Network Management Protocol). SNMP is a protocol for managing a network system by monitoring, through a network, apparatuses connected through the network.

Figure 2:
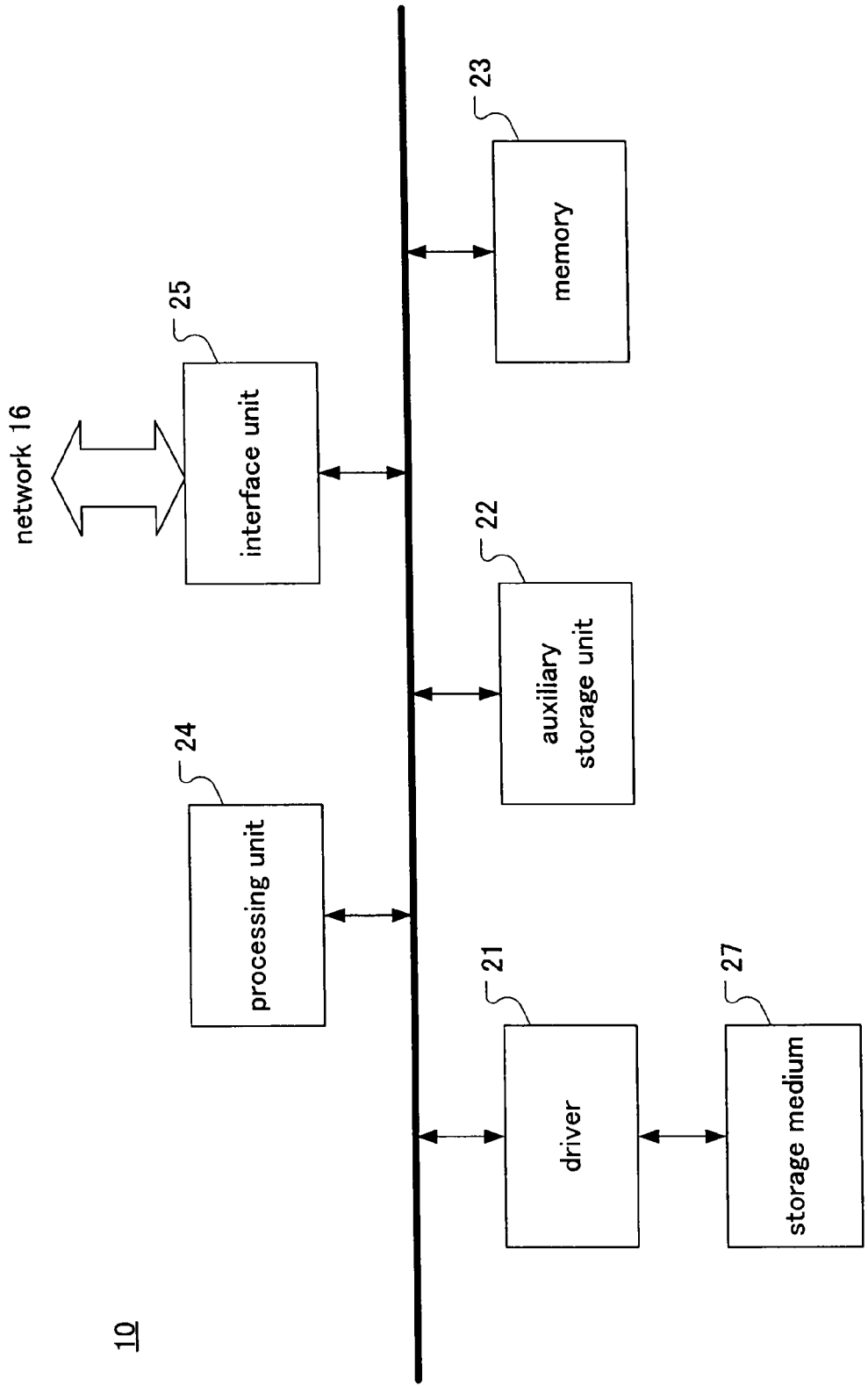
FIG. 2 is a block diagram illustrating a hardware configuration of the computer 10 according to the present embodiment.

FIG. 2 is a block diagram illustrating a hardware configuration of the computer 10 according to the present embodiment.

As shown in FIG. 2, the computer 10 includes a driver 21, an auxiliary storage unit 22, a memory 23, a processing unit 24, and an interface unit 25. Programs for realizing processing on the computer 10 are stored in a storage medium 27, such as a CD-ROM.

The driver 21 reads data in the storage medium 27. When the storage medium 27, in which the programs are stored, is loaded in the driver 21, the programs are installed in the auxiliary storage unit 22 through the driver 21. The programs stored in the storage medium 27 may include printer drivers, PC-FAX drivers, or any other various device drivers. Below, for simplicity, it is assumed that the programs are printer drivers.

The auxiliary storage unit 22 stores the installed programs, and other necessary files and data.

The memory 23 reads the programs from the auxiliary storage unit 22 and loads the programs when receiving an instruction to start the programs.

The processing unit 24 executes functions of the computer 10 according to the programs stored in the memory 23.

The interface unit 25 connects the computer 10 with the network 16 as shown in FIG. 1.

Figure 3:
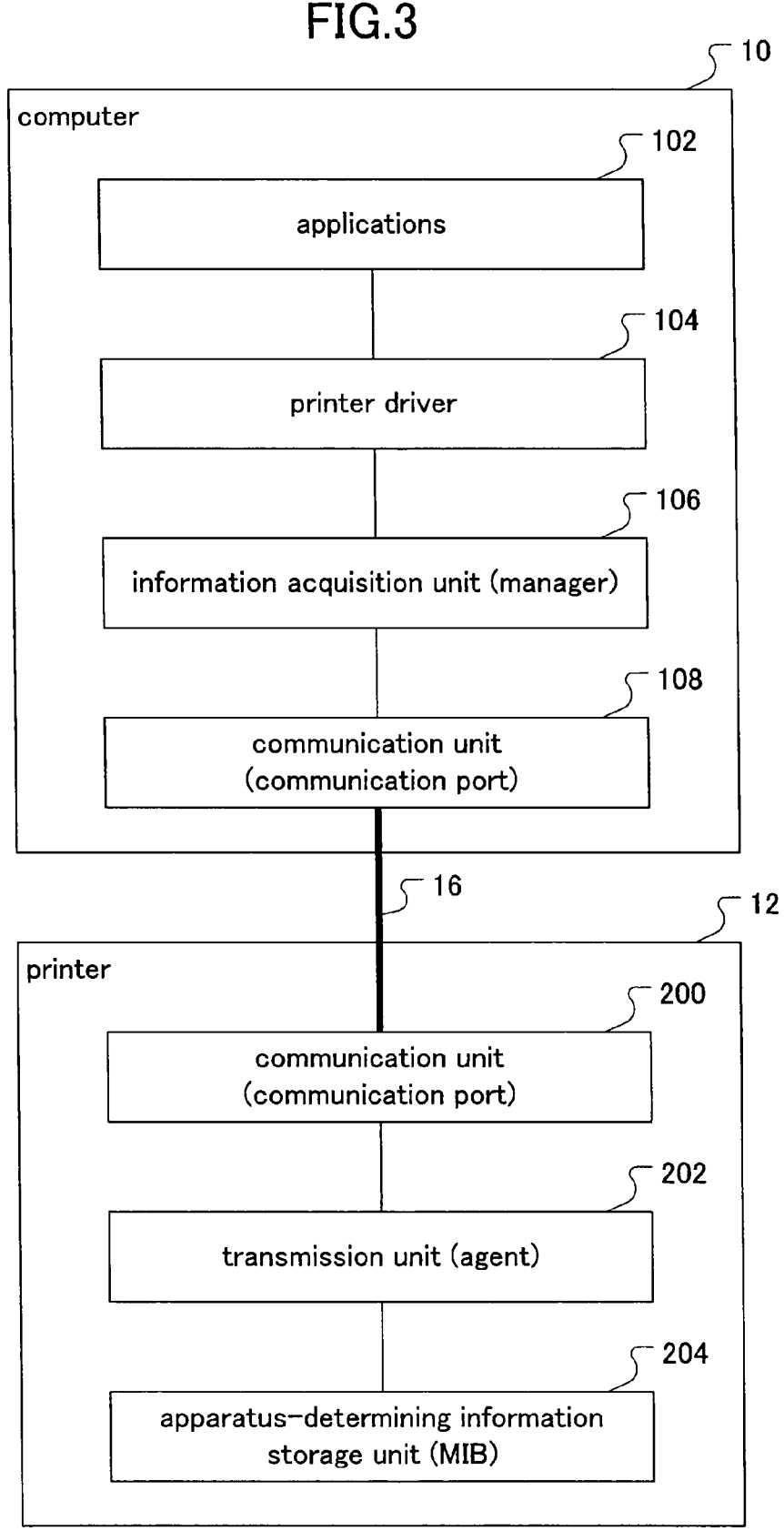
FIG. 3 is a block diagram illustrating a functional configuration of the computer 10 according to the present embodiment.

FIG. 3 is a block diagram illustrating a functional configuration of the computer 10 according to the present embodiment.

As shown in FIG. 3, the computer 10 is connected to the printer 12 via the network 16, and includes applications 102, a printer driver 104, an information acquisition unit 106, and a communication unit 108.

The applications 102 include application programs running on an OS (Operating System) like Windows (Registered Trademark). For example, the applications 102 include word-processing software (document preparation software), spreadsheet software, or other general-purpose software.

The printer driver 104 is a module for converting data created or viewed by the applications 102, together with OS internal instructions, into page-description language (PDL) data which are able to be processed by the printer 12.

The information acquisition unit 106 is a module for acquiring information from the applications 102, and/or for setting information stored in the printer 12. In an SNMP network system, a module like the information acquisition unit 106 is usually called "a manager", so, below, the information acquisition unit 106 is referred to as "a manager 106". Note that the manager 106 may be a part of a module for spooling the PDL data generated by the printer driver 104.

The communication unit 108 is a communication port for communicating with the printer 12 to receive data from or transmit data to the printer 12.

Further, as shown in FIG. 3, the printer 12 includes a communication unit 200, a transmission unit 202, and an apparatus-determining information storage unit 204.

The communication unit 200 is a communication port.

The transmission unit 202 acquires apparatus-determining information stored in the apparatus-determining information storage unit 204 in response to a request transmitted from the computer 10 through the network 16, and returns the apparatus-determining information to the computer 10. In the SNMP network system, a module like the transmission unit 202 is usually called "an agent", so, below, the transmission unit 202 is referred to as "the agent 202".

Here, the apparatus-determining information is information for determining the printer 12, for example, the apparatus-determining information at least includes device-type name of the printer 12.

The apparatus-determining information storage unit 204 is a module for storing the apparatus-determining information of the printer 12. In the SNMP network system, a module like the apparatus-determining information storage unit 204 is usually called "MIB" (Management Information Base), so that below, the apparatus-determining information storage unit 204 is referred to as "the MIB 204".

FIG. 4 is a block diagram illustrating a configuration of the printer driver 104 installed in the computer 10 according to the present embodiment.

As shown in FIG. 4, the printer driver 104 is connected to the manager 106, and includes a user interface (UI) 40, and a function limitation unit 42. The manager 106 is connected to the agent 202 of the printer 12 through the network 16, as shown in FIG. 3.

The user interface (UI) 40 is used for performing printing setting of the printer 12, and includes a display unit 402, an input unit 404, a setting storage unit 406, and a setting reading unit 408.

The display unit 402 is used to present a printing setting screen image of the printer 12 on a not-illustrated display device, such as a monitor. The display unit 402 also receives setting values input by a user.

The input unit 404 is used by the user to input setting values of printing setting items of the printer 12. For example, the input unit 404 may be a mouse or keyboard.

The setting storage unit 406 stores setting values of printing setting items of the printer 12.

The setting reading unit 408 reads the setting values stored in the setting storage unit 406.

The function limitation unit 42 reflects function limitation information designated for the printer 12 connected to the computer 10 on the setting screen image displayed by the display unit 402. The function limitation unit 42 includes a storage unit 422, a function list file selection unit 424, and a display items generation unit 426.

The storage unit 422 includes a function limiting file storage unit 422a which stores function limiting files each including descriptions of function limitations for the printer 12 connected to the computer 10, a function list file storage unit 422b which stores function list files each including descriptions of information indicating functions available in the printer 12.

The function list files are grouped depending on classification of the printers. For example, some of the function list files include descriptions of information of functions available in printers of the same type, and the other function list files include descriptions of information of functions available in all printers despite the type of the printers. It should be noted that classification of the printers is not limited to the apparatus-type, for example, the printers can be classified by venders of the printers.

The function list file selection unit 424 selects one of the function list files corresponding to the printer in use from the function list file storage unit 422*b*. The function list file selection unit 424 includes an apparatus-determining information acquisition unit 428 for acquiring the apparatus-determining information from the printer 12, and the apparatus-determining information is used as information for appropriately selecting the function list files.

The display items generation unit 426 generates display items (for example, functions, options, ranges of setting values, and others) of a setting screen image to be displayed by the display unit 402 of the user interface (UI) 40 based on functions and prohibition rules between printers described in the function list file selected by the function list file selection unit 424, and function limitation information described in the function limiting file stored in the function limiting file storage unit 422*a*.

FIG. 5 is a diagram illustrating an example of the function list file.

As shown in FIG. 5, a function list file 50 may include descriptions of an applicable range of the function list file (for example, described in an item of "@printer"), functions available in the printer (for example, described in an item of "@function"), default values of functions (for example, described in an item of "@default"), available setting values of functions (options, ranges of setting values, and others) (for example, described in an item of "@value"), and prohibition rules between apparatuses (for example, described in an item of "@invalid").

As described above, there are function list files dependent on the apparatus type, and function list files independent of the apparatus type (namely, general-purpose function list files). The function list file 50 shown in FIG. 5 is a function list file dependent on the apparatus type. Hence, in a leading portion 510 of the function list file 50, it is described that @printer="model A", indicating that the function list file 50 is applicable to apparatus type "model A".

For a function list file independent of the apparatus type, it is described that @printer="general" in the leading portion of the function list file, indicating that the function list file is a general-purpose function list file (refer to FIG. 6 for detail).

As shown in FIG. 5, the function list file 50 includes a first description portion 520 relating to descriptions of a function A (denoted as "functionA"), a second description portion 530 relating to descriptions of a function B (denoted as "functionB"), and a third description portion 540 relating to descriptions of a function C(denoted as "functionC"), indicating that the function A, the function B, and the function C are installed in the printer of the type "model A".

In a leading portion 520*a* of the first description portion 520, it is described that @funciton="functionA", indicating that the first description portion 520 is related to descriptions of the function A.

In a portion 520*b* of the first description portion 520, it is described that @default="valueA1", indicating that the default value of the function A is "valueA1".

In a portion 520*c* following a portion 520*b* of the first description portion 520, there are prohibition rule descriptions, in which it is described that
@invalid="functionC isn't valueC1",
@invalid="functionD is valueD2",
indicating that the function A is invalid when the function C is not valueC1, or the function D is valueD2.

The first description portion 520 further includes a portion 521*a*, a portion 522*a*, a portion 523*a*, and a portion 524*a* indicating options of the function A, that is, "valueA1", "valueA2", "valueA3", and "valueA4", respectively. Namely, the value of the function A is set to be one of the four options "valueA1", "valueA2", "valueA3", and "valueA4". Note that when the prohibition rules are set for one or more of the four options "valueA1", "valueA2", "valueA3", and "valueA4", it is not always that one of the four options "valueA1", "valueA2", "valueA3", and "valueA4" must be assigned to the function A.

For example, in FIG. 5, below the first option "valueA1", there is a prohibition rule description 521*b* set for the option "valueA1" as below
@invalid="functionB is valueB2, functionC is valueC3",
indicating that the option "valueA1" is invalid when the functionB is valueB2, and the function C is set to be valueC3.

In addition, below the third option "valueA3", there is a prohibition rule description 523*b* set for the option "valueA3" as below
@invalid="functionE is valueE1",
indicating that the option "valueA3" is invalid when the functionE is valueE1.

The second description portion 530 and the fourth description portion 540 have similar structures.

FIG. 6 is a diagram illustrating another example of the function list file.

A function list file 60 in FIG. 6 has the same function as the function list file 50 in FIG. 5, except that the function list file 60 in FIG. 6 is a function list file independent of the apparatus type, and thus in the portion 620 of the function list file 60 it is described that @printer="general", indicating that the function list file 60 is a general-purpose function list file.

As shown in FIG. 6, the function list file 60 includes a first description portion 620 related to descriptions of a function A (denoted as "functionA"), and a second description portion 630 related to descriptions of a function C (denoted as "functionC"). Compared to the function list file 50 related to the apparatus type "model A", it is clear that there is no description related to the function B.

The first description portion 620 differs from the first description portion 520 of the function list file 50 related to the apparatus type "model A" in that there are only three options "valueA1", "valueA2", and "valueA3". In other words, in the general-purpose function list file 60, it is not allowed for the value of the function A to be "value4".

In addition, the first description portion 620 further differs from the first description portion 520 of the function list file 50 related to the apparatus type "model A" in that there is no prohibition rule description.

The second description portion 630 includes the same descriptions as the second description portion 530 of the function list file 50 related to the apparatus type "model A".

FIG. 7 is a diagram illustrating an example of the function limiting file.

As shown in FIG. 7, a function limiting file 70 may include the name of the user using the function limiting file (for example, described in an item of "@lockuser"), functions to be locked (for example, described in an item of "@function"), available setting values of the functions to be locked (options, ranges of setting values, and others) (for example, described in an item of "@value"), and fixed values of the functions to be locked (for example, described in an item of "@lock").

The function limiting file 70 shown in FIG. 7 is a file for locking functions of a printer in connection with a specific user. Hence, it is described in a leading portion 710 of the function limiting file 70 that @lockuser="xxx", indicating that the function limiting file 70 is applicable to a user "xxx".

It should be noted that the function limiting file 70 is not limited to an individual user, but is applicable to the authority of a network manager, types of documents to be printed, or the printer being used.

In addition, when the target subject to function limitation is not described in the function limiting file 70, the limitation to printing setting items can be applied to all users using the current printer driver.

As shown in FIG. 7, The function limiting file 70 includes a first description portion 720 related to descriptions of a function A, and a second description portion 730 related to descriptions of a function B.

In a leading portion 721 of the first description portion 720, it is described that @function="functionA", indicating that the first description portion 720 is related to descriptions of the function A. Then, there is a description portion 722 including descriptions @value="valueA2",
@value="valueA3",
@value="valueA4", indicating that the user is allowed to voluntarily set one of three options "valueA2", "valueA3", "valueA4" as the function A. Note that the description portion 722 may also include options that the user is allowed to voluntarily set as the function A.

In a leading portion 731 of the second description portion 730, it is described that @funciton="functionB", indicating that the second description portion 730 is related to descriptions of the function B. Then, there is a description portion 732 @lock="valueB1", indicating that the value of the function B is fixed to be valueB1, and the user is not allowed to voluntarily change the value.

Next, it is assumed that the function list file 50 related to the apparatus type "model A" as shown in FIG. 5, the general-purpose function list file 60 as shown in FIG. 6, and the function limiting file 70 related to the user "xxx" as shown in FIG. 7 are installed in the printer driver 104, and operations of the printer driver 104 are described.

First Embodiment

In this embodiment, descriptions are made of operations of the printer driver 104 for displaying a printing setting screen image of a printer in response to an instruction of the user.

Figure 8:
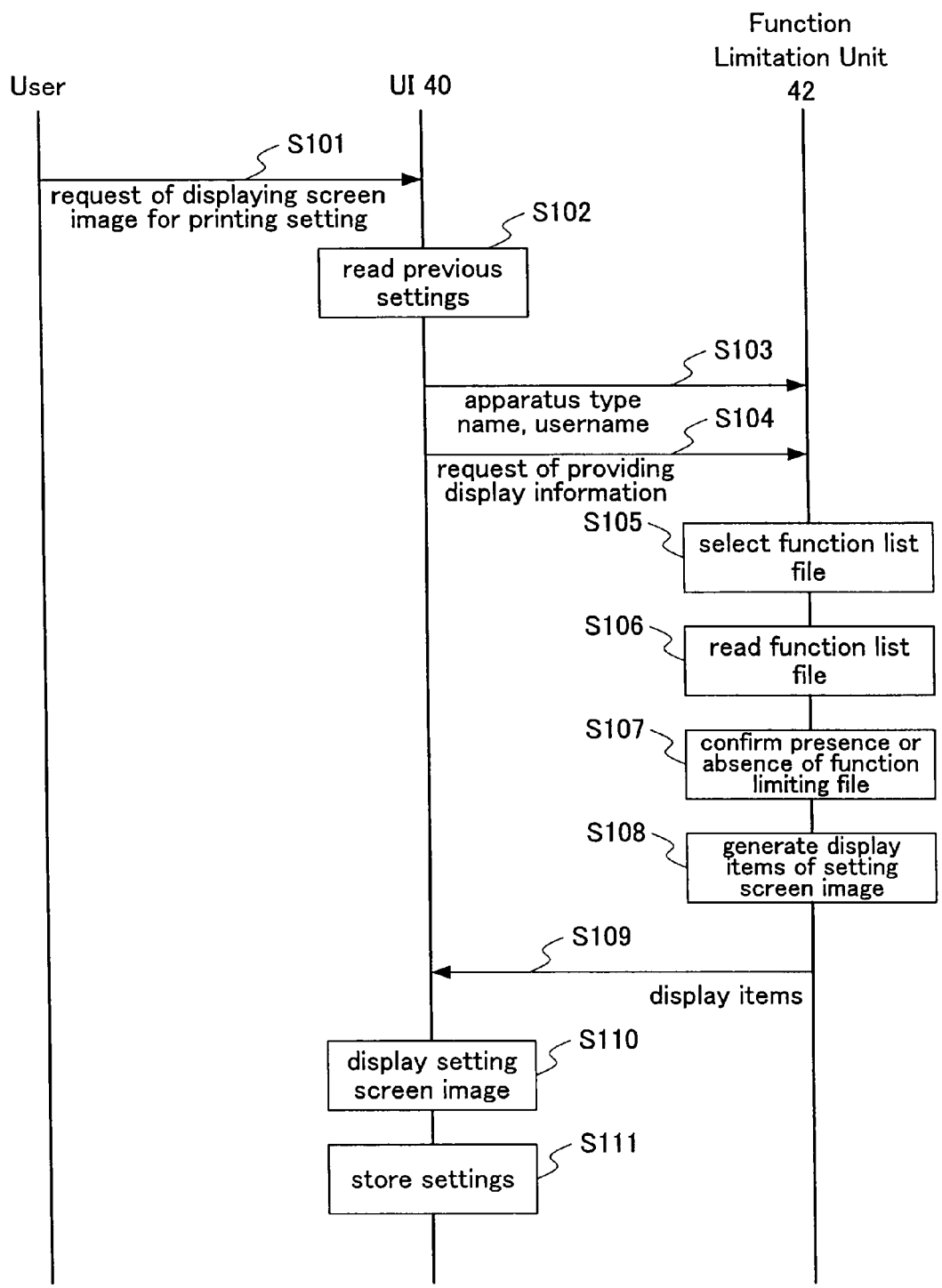
FIG. 8 is a sequence diagram illustrating operations of the printer driver 104 according to the present embodiment for displaying a printing setting screen image of the printer in response to an instruction of the user.

FIG. 8 is a sequence diagram illustrating operations of the printer driver 104 according to the present embodiment for displaying a printing setting screen image of the printer in response to an instruction of the user.

In step S101, the printer driver 104 receives a request from the user of displaying a screen image for printing setting of the printer 12 of a type "model A" in the input unit 404 of the user interface (UI) 40.

When the OS (Operating System) running on the computer 10 is Windows (Registered Trademark), the user selects "Printer" from the "Control Panel", and clicks the right mouse button to open a menu with the printer 12 being selected, and selects "property" from the menu, thereby, opening a setting screen image of the printer driver 104 to request the printer driver 104 to display the setting screen image for printing setting of the printer 12. Alternatively, the user selects "property" from a printing setting screen image of an application being used for preparing a document to request the printer driver 104 to display a setting screen image of the printer 12.

In step S102, upon receiving the request from the user, the user interface (UI) 40 reads out, from the setting reading unit 408, previous settings stored in the setting storage unit 406, and the user name for determining the user who made the request. Here, the "previous settings" means the apparatus type name of the printer connected to the communication port 108 the last time. When the previous settings are not stored, for example, immediately after installation, the default name designated during fabrication or the name of the apparatus type designated by a manager can be used. The user name may be input by the user when requesting to display the setting screen image. Alternatively, both the user name and the apparatus type name may be stored in the setting storage unit 406 as the previous settings. In the present embodiment, it is assume that the apparatus type name stored as the "previous settings" is "model A", the same as that of the printer 12 being used currently.

In step S103, the user interface (UI) 40 transmits the thus obtained user name and the apparatus type name to the function limitation unit 42.

In step S104, the user interface (UI) 40 requests the function limitation unit 42 to provide information for displaying the setting screen image by the display unit 402 of the user interface (UI) 40.

Note that the order of step S103 and step S104 can be exchanged, or step S103 and step S104 can be executed at the same time.

In step S105, the function list file selection unit 424 of the function limitation unit 42 selects a function list file corresponding to the apparatus type name transmitted from the user interface (UI) 40 from the function list file storage unit 422*b*.

In the present embodiment, since the apparatus type transmitted from the user interface (UI) 40 is "model A", and there exists the function list file 50 related to the apparatus type "model A" in the function list file storage unit 422*b*, the function list file selection unit 424 selects the function list file 50 from the function list file storage unit 422*b*.

In step S106, the display items generation unit 426 reads the function list file 50.

In step S107, based on the user name transmitted from the user interface (UI) 40, the display items generation unit 426 confirms whether there is a function limiting file corresponding to the user name in the function list file storage unit 422*b*, and when a function limiting file corresponding to the user name is found in the function list file storage unit 422*b*, the display items generation unit 426 reads in the function list file.

In the present embodiment, since there is the function limiting file 70 related to the username "xxx" stored in the function list file storage unit 422*b*, when the user name transmitted from the user interface (UI) 40 is "xxx", the display items generation unit 426 reads in the function limiting file 70. On the other hand, when the user name transmitted from the user interface (UI) 40 is different from "xxx", the display items generation unit 426 does not read in a function limiting file from the function list file storage unit 422*b*.

In step S108, the display items generation unit 426 generates display items of a setting screen image based on the function list file 50 and the function limiting file 70, if it is read in step S107.

In step S109, the display items generation unit 426 transmits the thus obtained display items information to the user interface (UI) 40.

In step S110, the user interface (UI) 40 displays a setting screen image based on the display items information generated in the function limitation unit 42 on the display unit 402.

In step S111, the user interface (UI) 40 stores the display items information in the setting storage unit 406. The display items information stored in the setting storage unit 406 includes the apparatus type name, and when it is requested again to display a screen image for printing setting, the display items information is used as the previous setting.

The screen images displayed on the display unit 402 of the user interface (UI) 40 through the above operations are illustrated in FIG. 9A and FIG. 9B.

FIG. 9A and FIG. 9B are schematic views illustrating examples of the printing setting screen images according to the present embodiment.

Specifically, FIG. 9A shows a setting screen image 90a, the UI setting items of which are generated based merely on the function list file 50 related to the apparatus type "model A", when the username transmitted from the user interface (UI) 40 to the function limitation unit 42 is not "xxx", and the function limiting file 70 related to the user "xxx" fails to be read from the function limiting file storage unit 422a. The setting screen image 90a has a "printing setting" tab 91, in which items 910, 920, and 930 are displayed for respectively setting the function A, the function B, and the function C installed in the printer of the type "model A" according to descriptions of the function list file 50.

FIG. 9B shows a setting screen image 90b, the UI setting items of which are generated based both the function list file 50 related to the apparatus type "model A" and the function limiting file 70 related to the user "xxx", when the username transmitted from the user interface (UI) 40 to the function limitation unit 42 is "xxx", and the function limiting file 70 is read from the function limiting file storage unit 422a.

Similar to the setting screen image 90a, the setting screen image 90b has a "printing setting" tab 91, in which items 910, 920, and 930 are displayed for respectively setting the function A, the function B, and the function C installed in the printer of the type "model A" according to descriptions of the function list file 50. However, compared to the setting screen image 90a in FIG. 9A, the setting screen image 90b is more adapted to the function limiting file 70, specifically, among the options of the function A, the option "valueA1", which is not allowed to be used, is deleted, and the option of the function B is fixed to the option "valueB".

In this way, since the computer of the present embodiment stores the function list file in advance on the computer side, the computer of the present embodiment is able to limit functions of the printer in connection without interactive communications.

Second Embodiment

In this embodiment, descriptions are made of operations of the printer driver 104 for updating a setting screen image of a printer when a printer in usage is changed from a printer of the type "model A" to a printer of the type "model B".

Figure 10:
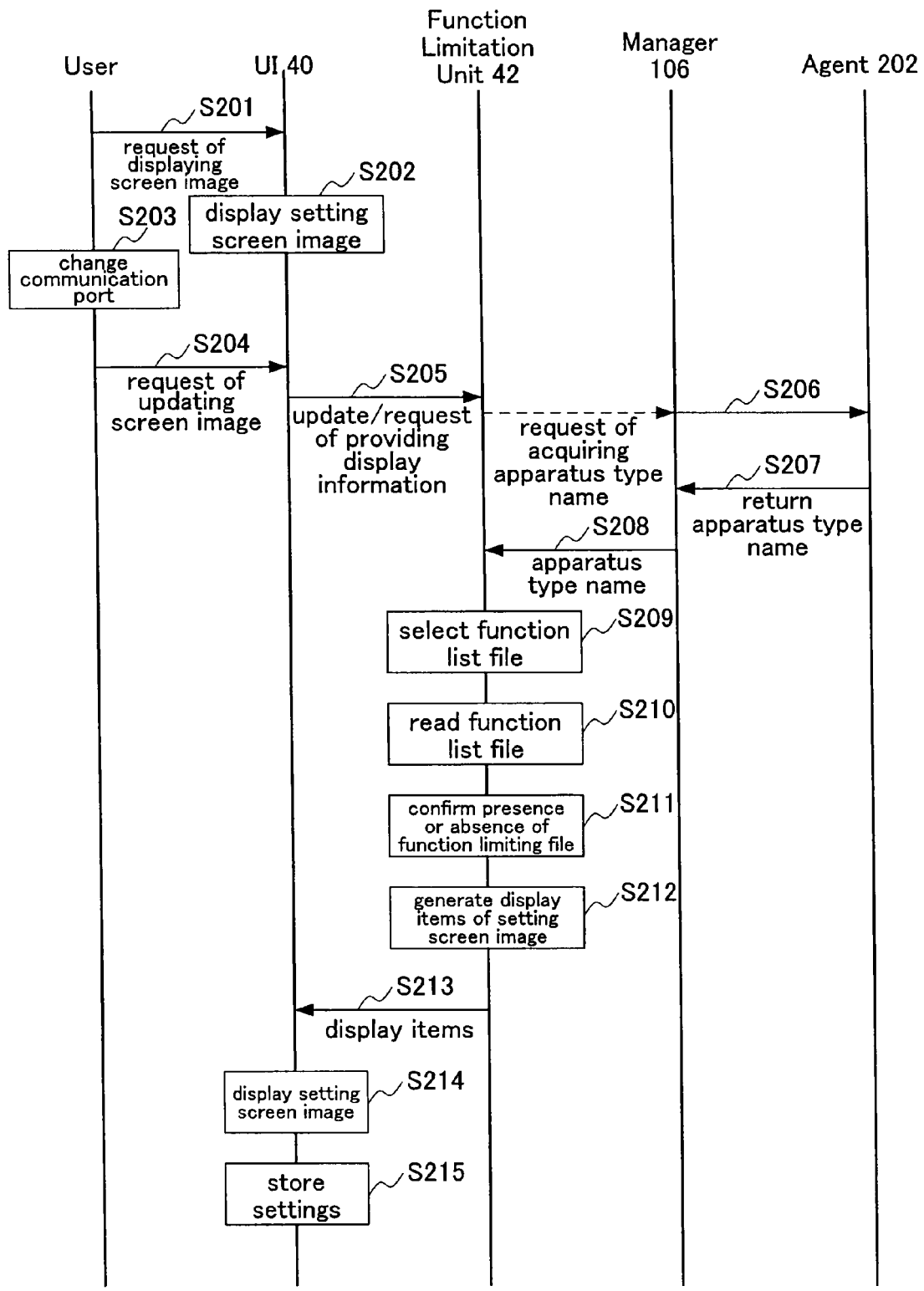
FIG. 10 is a sequence diagram illustrating operations of the printer driver 104 according to the present embodiment for updating a setting screen image of a printer in use when the printer in use is changed from type "model A" to type "model B.

FIG. 10 is a sequence diagram illustrating operations of the printer driver 104 according to the present embodiment for updating setting screen image of a printer in use when the printer in use is changed from type "model A" to type "model B.

In step S201, the printer driver 104 receives a request from the user of displaying a screen image for printing setting of the printer 14 of a type "model B" in the input unit 404 of the user interface (UI) 40.

When the OS (Operating System) running on the computer 10 is Windows (Registered Trademark), the user selects "Printer" from the "Control Panel", and clicks the right mouse button to open a menu with the printer 12 being selected, and selects "property" from the menu, thereby, opening a setting screen image of the printer driver 104 to request the printer driver 104 to display the setting screen image for printing setting of the printer 14.

In step S202, upon receiving the request from the user, the printer driver 104 displays the setting screen image for printing setting of the printer 14 in the way as described with reference to FIG. 8 in the first embodiment. At this moment, since the printer in connection with the printer driver 104 is still the printer 12, the printer driver 104 displays the setting screen image of the printer 12 of the type "model A", as the setting screen image 90a or the setting screen image 90b shown in FIG. 9A and FIG. 9B.

In step S203, as shown in FIG. 9A and FIG. 9B, each of the setting screen image 90a and the setting screen image 90b further has a "Port" tab 92 arranged for setting the communication port 108 in connection with the printer currently in use.

In order to change the printer currently in use (that is, in connection with the printer driver 104) from the printer 12 of the type "model A" to the printer of the type "model B, the user opens the port tab 92 in the setting screen image 90a and the setting screen image 90b through the input unit 404 of the user interface (UI) 40, and changes the communication port 108 currently in use to a communication port in connection with the printer of the type "model B".

Figure 11:
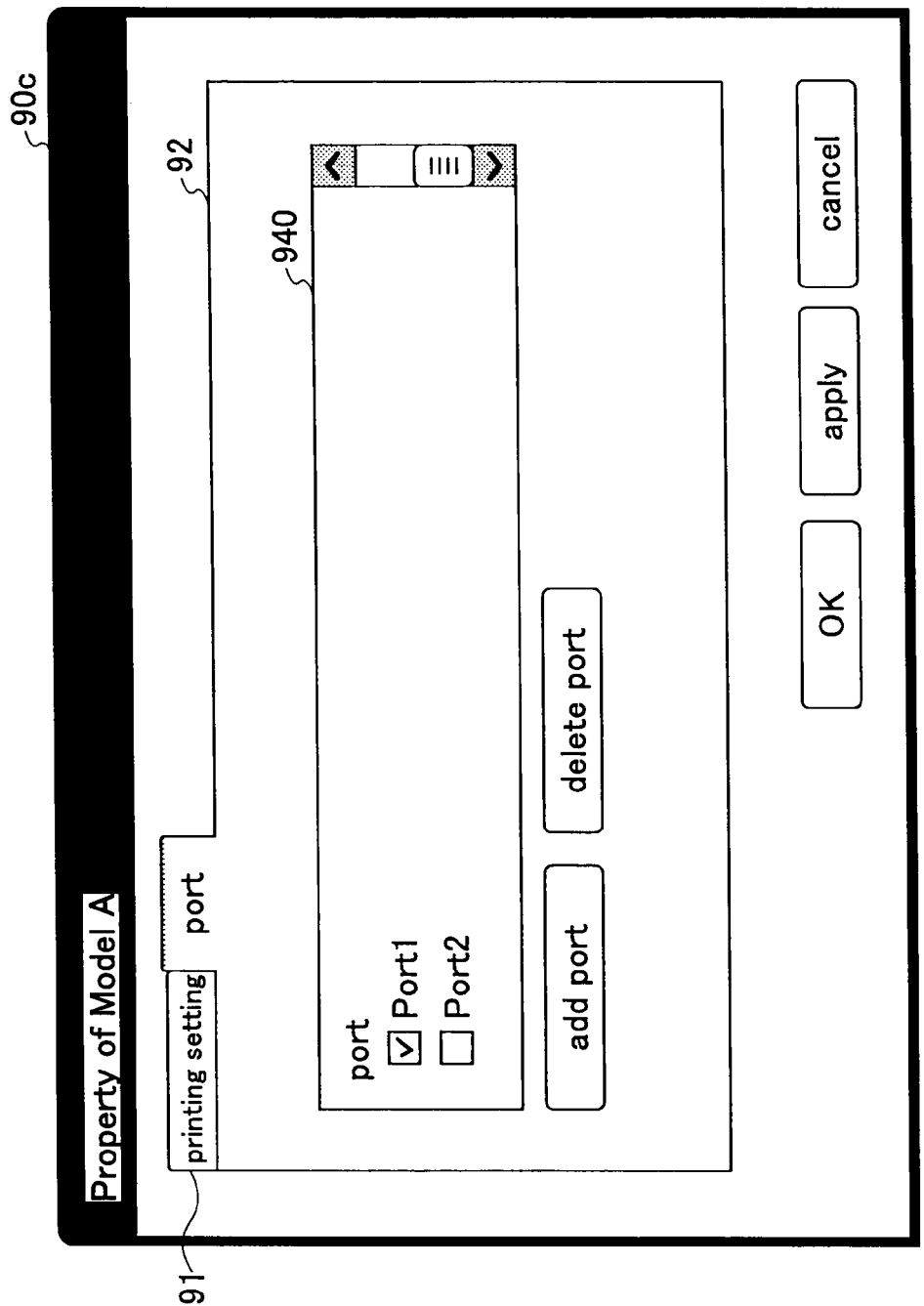
FIG. 11 is a schematic view illustrating an example of the printing setting screen image according to the present embodiment.

FIG. 11 is a schematic view illustrating an example of the printing setting screen image according to the present embodiment.

Specifically, FIG. 9 shows a setting screen image 90c in which the port tab 92 is displayed explicitly.

In the port tab 92, a port list box 940 is displayed to list the ports in connection. As shown in FIG. 11, there are a port1 and a port2 in the port list box 940 in the setting screen image 90c. A check box is provided for each option of the ports in the port list, and the port currently selected is checked with a check mark.

For example, assuming that the printer 12 of the type "model A" is connected to the port 1 and a printer of the type "model B" is connected to the port 2, if the user selects the port 2 in connection with printer of the type "model B" through the input unit 404 of the user interface (UI) 40, it is possible to change the printer currently in connection with the printer driver 104 from the printer 12 of the type "model A" to the printer of the type "model B.

Returning to FIG. 10, in step S204 the user again opens the "printing setting" tab 91 in the setting screen image 90a or the setting screen image 90b through the input unit 404 of the user interface (UI) 40, and clicks an "update" button 94 arranged in the printing setting tab 91 (refer to FIG. 9) to request updating the setting screen image of the printer.

In step S205, upon receiving the request from the user, the user interface (UI) 40 requests the function limitation unit 42 to execute updating of the setting screen image, and requests the function limitation unit 42 to provide information for displaying the setting screen image by the display unit 402 of the user interface (UI) 40.

In step S206, upon receiving the request from the user interface (UI) 40, the function limitation unit 42 uses the apparatus-determining information acquisition unit 428 of the function list file selection unit 424 to request the manager 106 (the information acquisition unit 106) so that the manager 106 further requests, through the network 16, the agent 202 (the transmission unit 202) of the printer 14 of the type "model B" to acquire the apparatus type name.

In step S207, the agent 202 acquires the apparatus type name "model B" from the MIB 204 (the apparatus-determining information storage unit 204), and returns the obtained apparatus type name "model B" to the manager 106.

In step S208, the manager 106 transmits the apparatus type name "model B" obtained from the printer 14 to the apparatus-determining information acquisition unit 428 of the function list file selection unit 424.

In step S209, the function list file selection unit 424 of the function limitation unit 42 selects, from the function list file storage unit 422b, a function list file corresponding to the apparatus type name "model B" transmitted from the printer 14.

In this example, since there are only the function list file 50 related to the apparatus type "model A" and the general-purpose function list file 60 independent of the apparatus type in the function list file storage unit 422b, there is not a function list file related to the apparatus type "model B", so that the function list file selection unit 424 of the function limitation unit 42 selects the general-purpose function list file 60 from the function list file storage unit 422b.

In step S210, the display items generation unit 426 reads in the selected general-purpose function list file 60.

In step S211, based on the user name transmitted from the user interface (UI) 40, the display items generation unit 426 confirms whether there is a function limiting file corresponding to the user name in the function list file storage unit 422b, and when a function limiting file corresponding to the user name is found in the function list file storage unit 422b, the display items generation unit 426 reads in the function list file.

In the present embodiment, since there is the function limiting file 70 related to the username "xxx" stored in the function list file storage unit 422b, when the user name transmitted from the user interface (UI) 40 is "xxx", the display items generation unit 426 reads in the function limiting file 70. On the other hand, when the user name transmitted from the user interface (UI) 40 is different from "xxx", the display items generation unit 426 does not read in a function limiting file from the function list file storage unit 422b.

In step S212, the display items generation unit 426 generates display items of a setting screen image based on the obtained general-purpose function list file 60 and the function limiting file 70 (if it is read in step S211).

In step S213, the display items generation unit 426 transmits the thus obtained display items information to the user interface (UI) 40.

In step S214, the user interface (UI) 40 displays a setting screen image based on the display items information generated in the function limitation unit 42 on the display unit 402.

In step S215, when the user clicks an "OK" or an "Apply" button in the re-displayed setting screen image (refer to elements 122 or 124 in FIG. 12), the user interface (UI) 40 stores the display items information in the setting storage unit 406.

The screen images displayed on the display unit 402 of the user interface (UI) 40 through the above operations are illustrated in FIG. 12A and FIG. 12B.

FIG. 12A and FIG. 12B are schematic views illustrating examples of the printing setting screen images according to the present embodiment.

Specifically, FIG. 12A shows a setting screen image 120a, the UI setting items of which are generated based merely on the general-purpose function list file 60, when the username transmitted from the user interface (UI) 40 to the function limitation unit 42 is not "xxx", and the function limiting file 70 related to the user "xxx" fails to be read from the function limiting file storage unit 422a. The setting screen image 120a has a "printing setting" tab 121 including items 1210 and 1220 displayed for respectively setting the function A and the function C, which are independent from apparatus type and are commonly installed in the printers according to descriptions of the function list file 60.

FIG. 12B shows a setting screen image 120b, the UI setting items of which are generated based both the general-purpose function list file 60 and the function limiting file 70 related to the user "xxx", when the username transmitted from the user interface (UI) 40 to the function limitation unit 42 is "xxx", and the function limiting file 70 is read from the function limiting file storage unit 422a.

Similar to the setting screen image 120a, the setting screen image 120b has a "printing setting" tab 121 including items 1210 and 1220 displayed for respectively setting the function A and the function C, which are independent from the apparatus type and are commonly installed in the printers according to descriptions of the function list file 60.

However, compared to the setting screen image 120a in FIG. 12A, the setting screen image 120b is more adapted to the function limiting file 70; specifically, among the options of the function A, the option "valueA1", which is not allowed to be used, is deleted, and the option of the function B is fixed to the option "valueB".

In this way, since the computer of the present embodiment stores the function list file dependent or independent of the apparatus type in advance on the computer side, the computer of the present embodiment is able to limit functions of plural printers of different apparatus types even hen the installed printer drivers are not in a one-to-one relationship with the printers in connection.

Third Embodiment

In this embodiment, descriptions are made of operations of the printer driver 104 for stopping processing when bi-directional communications between the printer driver 104 and the printer 14 fail.

Figure 13:
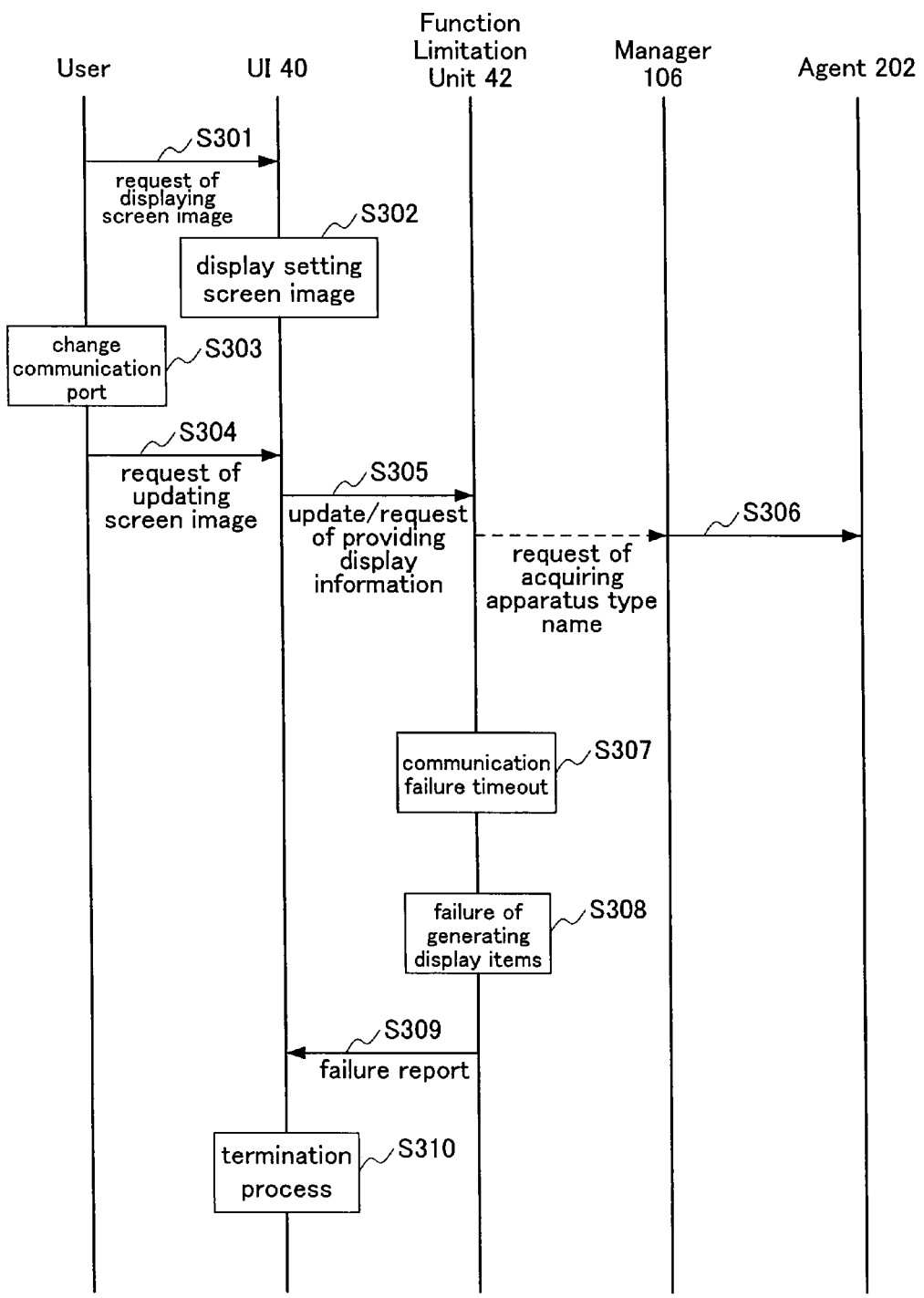
FIG. 13 is a sequence diagram illustrating operations of the printer driver 104 according to the present embodiment for stopping processing when failure occurs in bi-directional communications between the printer driver 104 and the printer 14 in the operations of updating the setting screen image as described with reference to FIG. 10 in the second embodiment.

FIG. 13 is a sequence diagram illustrating operations of the printer driver 104 according to the present embodiment for stopping processing when failure occurs in bi-directional communications between the printer driver 104 and the printer 14 in the operations of updating the setting screen image as described with reference to FIG. 10 in the second embodiment.

In step S301, the printer driver 104 receives a request from the user of displaying a screen image for printing setting of the printer 14 of a type "model B" in the input unit 404 of the user interface (UI) 40.

In step S302, upon receiving the request from the user, the printer driver 104 displays the setting screen image for printing setting of the printer 14 in the way as described with reference to FIG. 8 in the first embodiment. At this moment, since the printer in connection with the printer driver 104 is still the printer 12, the printer driver 104 displays the setting screen image of the printer 12 of the type "model A", as the setting screen image 90a or the setting screen image 90b shown in FIG. 9A and FIG. 9B.

In step S303, in order to change the printer currently in use (that is, in connection with the printer driver 104) from the printer 12 of the type "model A" to the printer of the type "model B, the user opens the port tab 92 in the setting screen image 90a and the setting screen image 90b through the input unit 404 of the user interface (UI) 40, and changes the communication port 108 currently in use to a communication port in connection with the printer of the type "model B".

In step S304, the user again opens the "printing setting" tab 91 in the setting screen image 90a or the setting screen image 90b through the input unit 404 of the user interface (UI) 40, and clicks an "update" button 94 arranged in the printing setting tab 91 (refer to FIG. 9) to request updating the setting screen image of the printer.

In step S305, upon receiving the request from the user, the user interface (UI) 40 requests the function limitation unit 42 to execute updating of the setting screen image, and requests the function limitation unit 42 to provide information for displaying the setting screen image by the display unit 402 of the user interface (UI) 40.

In step S306, upon receiving the request from the user interface (UI) 40, the function limitation unit 42 uses the apparatus-determining information acquisition unit 428 of the function list file selection unit 424 to request the manager 106 (the information acquisition unit 106) so that the manager 106 further requests, through the network 16, the agent 202 (the transmission unit 202) of the printer 14 of the type "model B" to acquire the apparatus type name.

In step S307, when the apparatus type name is not returned from the printer 14 after a specified time period elapses since the request is sent to the printer 14, the function limitation unit 42 determines that failure has occurred in the bi-directional communications between the manager 106 and the agent 202. For example, power of the printer 14 is not turned ON.

In step S308, since the function limitation unit 42 fails to acquire the apparatus type name, the function limitation unit 42 cannot select a function list file from the function list file storage unit 422*b*. Thus, the function limitation unit 42 fails to generate display items of a setting screen image.

In step S309, the function limitation unit 42 reports the failure to generate the display items of the setting screen image to the user interface (UI) 40.

In step S310, upon receiving the failure report from the function limitation unit 42, the user interface (UI) 40 performs termination processing. For this purpose, for example, the user interface (UI) 40 keeps open the setting screen image for the printer of the type "model A", which is the setting screen image before the "update" button 94 is clicked in step S304. Alternatively, the user interface (UI) 40 displays a screen image on the display unit 402 to inform the user that the setting screen image cannot be updated because of the failure in the bi-directional communications between the user interface (UI) 40 and the printer 14.

Note that when the function limitation unit 42 cannot obtain the apparatus type name, the general-purpose function list files, which are independent on the apparatus type, can be used to generate the display items. Due to this, regardless the communication failure, it is possible to perform the minimum common printing setting for all printers.

Fourth Embodiment

In this embodiment, descriptions are made of operations of the printer driver 104 for stopping processing when the printer driver 104 fails to select a function list file.

FIG. 14 is a sequence diagram illustrating operations of the printer driver 104 according to the present embodiment for stopping processing when the printer driver 104 fails to select a function list file in the operations of displaying the setting screen image with reference to FIG. 10 in the first embodiment.

In step S401, the printer driver 104 receives a request from the user to display a screen image for printing setting of the printer 12 of a type "model A" in the input unit 404 of the user interface (UI) 40.

In step S402, upon receiving the request from the user, the user interface (UI) 40 reads out, from the setting reading unit 408, previous settings stored in the setting storage unit 406, and the user name for determining the user who made the request.

In step S403, the user interface (UI) 40 transmits the thus obtained user name and the apparatus type name to the function limitation unit 42.

In step S404, the user interface (UI) 40 requests the function limitation unit 42 to provide information for displaying the setting screen image by the display unit 402 of the user interface (UI) 40.

In step S405, the function list file selection unit 424 of the function limitation unit 42 selects a function list file corresponding to the apparatus type name transmitted from the user interface (UI) 40 from the function list file storage unit 422*b*.

In step S406, for example, when there is no function list file in the function list file storage unit 422*b* or for other reasons, the function list file selection unit 424 fails to select a function list file.

In step S407, therefore, the function limitation unit 42 fails to generate display items of a setting screen image.

In step S408, the function limitation unit 42 reports the failure to generate the display items of the setting screen image to the user interface (UI) 40.

In step S409, upon receiving the failure report from the function limitation unit 42, the user interface (UI) 40 performs termination processing. For this purpose, for example, the user interface (UI) 40 displays a screen image on the display unit 402 to inform the user that acquisition of the function list file has failed.

When the function limitation unit 42 fails to select the function list file because of there is no function list file in the function list file storage unit 422*b*, the function limitation unit 42 may acquire an appropriate function list file from an external server (not illustrated) or a website on the same network.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, in the above embodiments, it is described that setting is performed through the printer driver 104, but the present invention is not limited to this. The present invention is also applicable to a scanner driver, a PC facsimile machine driver, and any other kind of device driver as long as these device drivers are software able to convert instructions from an application to data able to be processed by an apparatus.

In addition, the present invention may be implemented by a computer program stored in a storage device of a data processing device, such as a hard disk (HDD), or a Read-Only Memory (ROM).

In addition, the present invention is not limited to device drivers or similar modules, but can be applied to applications.

This patent application is based on Japanese Priority Patent Applications No. 2007-153319 filed on Jun. 8, 2007, and No. 2007-186108 filed on Jul. 17, 2007, the entire contents of which are hereby incorporated by reference.

What is claimed is:

1. A data processing device, comprising:
    a function limiting file storage unit configured to store a function limiting file for limiting a function of an apparatus connected to the data processing device;
    a function list file storage unit configured to store a plurality of function list files dependent upon a type of the apparatus, such that a separate function list file is stored for each type of apparatus, and a plurality of function list files independent of the type of the apparatus, the function list files including descriptions of functions available in the apparatus;

an apparatus-determining information acquisition unit configured to acquire, from the apparatus, a device name of the apparatus;

a function list file selection unit configured to select one of the function list files corresponding to the type of the apparatus based on the device name of the apparatus; and a display item generation unit configured to generate a setting screen image for setting operations of the apparatus based on the selected one of the function list files, and the function limiting file stored in the function limiting file storage unit.

2. The data processing device as claimed in claim 1, wherein the function list files include descriptions of prohibition rules between functions of the apparatus.

3. The data processing device as claimed in claim 1, wherein the function limiting file limits the function of the apparatus by designating the function of the apparatus and/or a setting value of the function to be one of usable and un-usable.

4. The data processing device as claimed in claim 1, wherein different users have different function limiting files.

5. A computer readable storage medium storing a data processing program executable on a computer to drive the computer to execute a data processing method of a data processing device, the data processing method comprising:

a function limiting file storage step of storing a function limiting file for limiting a function of an apparatus connected to the data processing device;

a function list file storage step of storing a plurality of function list files dependent upon a type of the apparatus, such that a separate function list file is stored for each type of apparatus, and a plurality of function list files independent of the type of the apparatus, the function list files including descriptions of functions available in the apparatus;

acquiring, from the apparatus, a device name of the apparatus;

a function list file selection step of selecting one of the function list files corresponding to the type of the apparatus based on the device name of the apparatus; and a display item generation step of generating a setting screen image for setting operations of the apparatus based on the selected one of the function list files and the function limiting file stored in the function limiting file storage unit.

6. The computer readable storage medium as claimed in claim 5, wherein the function list files include descriptions of prohibition rules between functions of the apparatus.

7. The computer readable storage medium as claimed in claim 5, wherein the function limiting file limits the function of the apparatus by designating the function of the apparatus and/or a setting value of the function to be one of usable and un-usable.

8. The computer readable storage medium as claimed in claim 5, wherein different users have different function limiting files.

9. A data processing method of a data processing device, comprising:

a function limiting file storage step of storing a function limiting file for limiting a function of an apparatus connected to a data processing device;

a function list file storage step of storing a plurality of function list files dependent upon a type of the apparatus, such that a separate function list file is stored for each type of apparatus, and a plurality of function list files independent of the type of the apparatus, the function list files including descriptions of functions available in the apparatus;

acquiring, from the apparatus, a device name of the apparatus;

a function list file selection step of selecting one of the function list files corresponding to the type of the apparatus based on the device name of the apparatus; and a display item generation step of generating a setting screen image for setting operations of the apparatus based on the selected one of the function list files, and the function limiting file stored in the function limiting file storage unit.

10. The data processing method as claimed in claim 9, wherein the function list files include descriptions of prohibition rules between functions of the apparatus.

11. The data processing method as claimed in claim 9, wherein the function limiting file limits the function of the apparatus by designating the function of the apparatus and/or a setting value of the function to be one of usable and un-usable.

12. The data processing method as claimed in claim 9, wherein different users have different function limiting files.

13. The data processing device as claimed in claim 1, wherein when a function list file corresponding to the acquired device name of the apparatus is not stored in the function list file storage unit, the function list file selection unit selects one of the function list files that are independent of the type of apparatus.

* * * * *